Inventors:
Werner Fehse,
Wilhelm Hagen,
by Alexander S. ____
Their Attorney.

Dec. 17, 1929. W. FEHSE ET AL 1,740,397
SEAL AND METHOD FOR MAKING THE SAME
Filed Oct. 17, 1927 2 Sheets-Sheet 2
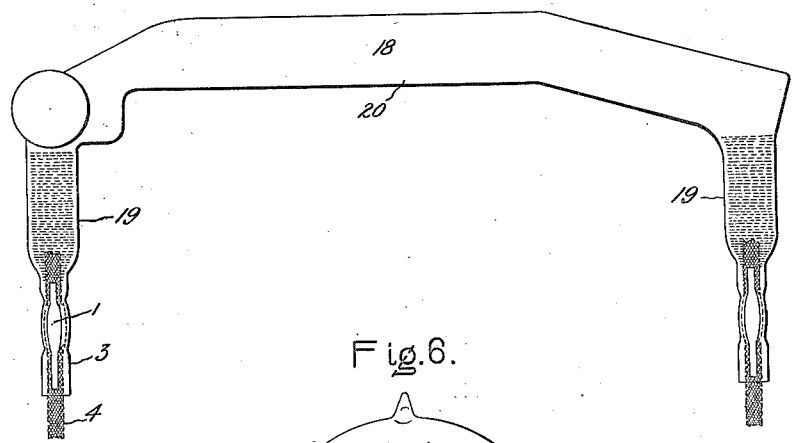
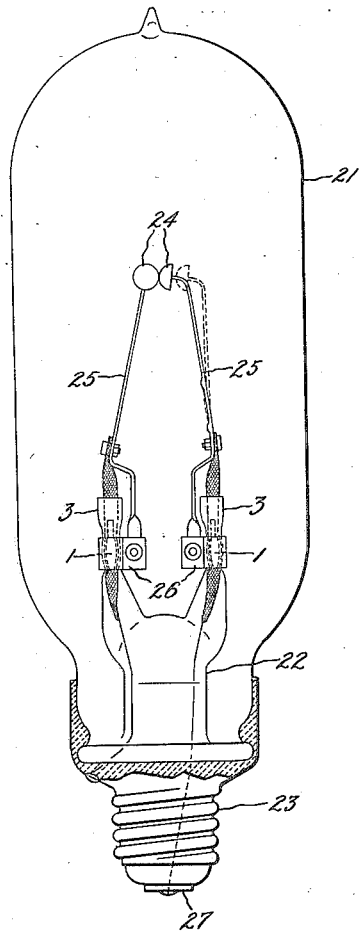
Inventor:
Werner Fehse,
Wilhelm Hagen,
by
Their Attorney.

Patented Dec. 17, 1929

1,740,397

UNITED STATES PATENT OFFICE

WERNER FEHSE, OF GROSS-LICHTERFELDE, WEST, AND WILHELM HAGEN, OF BERLIN, GERMANY, ASSIGNORS TO GENERAL ELECTRIC COMPANY, A CORPORATION OF NEW YORK

SEAL AND METHOD FOR MAKING THE SAME

Application filed October 17, 1927, Serial No. 226,553, and in Germany November 12, 1926.

The present invention relates to a seal and to a method for fusing leading-in conductors into glass. The air-tight fusion of metal to glass, even when the coefficient of expansion of the metal is substantially the same as that of the glass, always presents difficulties when the cross section of the metal is comparatively large as, for example, greater than 0.5 square millimeters. To overcome these difficulties, it has been proposed to provide a leading-in wire or a conductor in the form of a woven hose, but even in the use of such a conductor it has been practically impossible to always obtain air-tight fusion, since in the fusing-in process small air bubbles are usually produced between the fine single wires or in the meshes of the woven conductor, which bubbles later pass into the interior of the evacuated vessel with which the conductor is employed. This harmful air bubble formation takes place very easily when the glass vessel provided with the leading-in conductor consists of quartz or other glass which is fusible with difficulty. This is due to the fact that such glass is very tough and does not easily flow and fill out the very small holes between the wires.

One of the objects of the present invention is to provide an air tight seal and a method by which a hollow woven wire conductor may be fused into a vitreous material, such as quartz or other vitreous material which is fusible with difficulty, in a manner which will produce an air-tight seal.

In accordance with one feature of our invention a glass tube closed at one end and open at the other end is fused at its open end to a second glass tube surrounding the first tube. A woven wire hose is then pushed over the inner tube and a difference in pressure is produced between the interior of the inner tube and the surrounding annular space between the tubes. Heat is then applied to the outer tube by suitable burners causing thereby an inward movement of the walls of the outer tube and at the same time an outward movement of the walls of the inner tube. The movement toward one another of the softened parts of the inner and outer tubes permits a very intimate fusion of both tubes and causes a filling out of all the meshes of the interposed woven wire hose thus avoiding the formation of all air bubbles.

Figure 1:
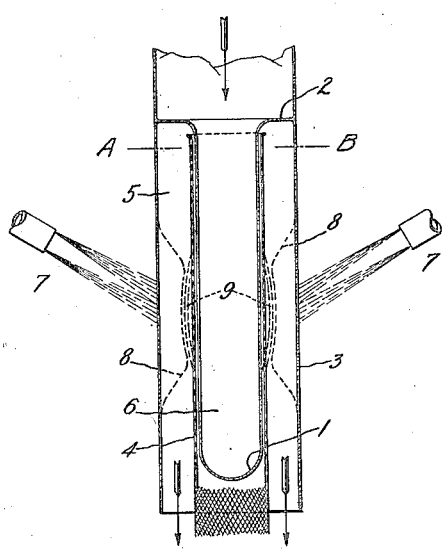
Figure 2:
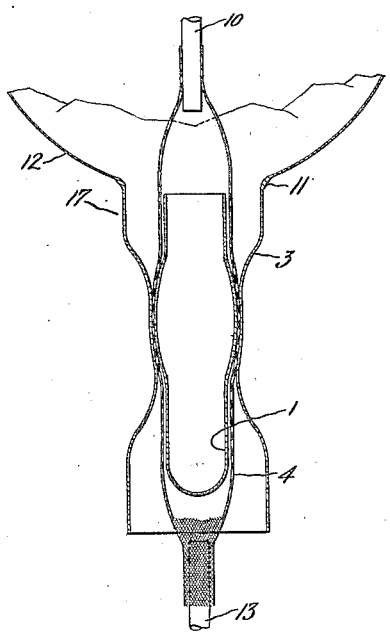
Figure 3:
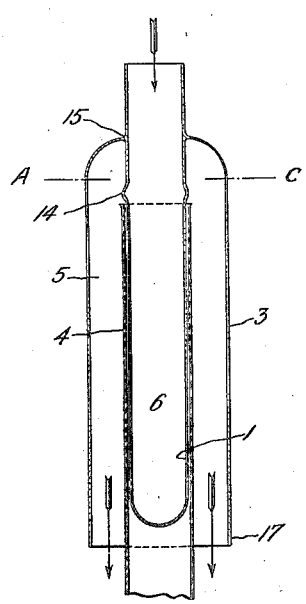
Figure 4:
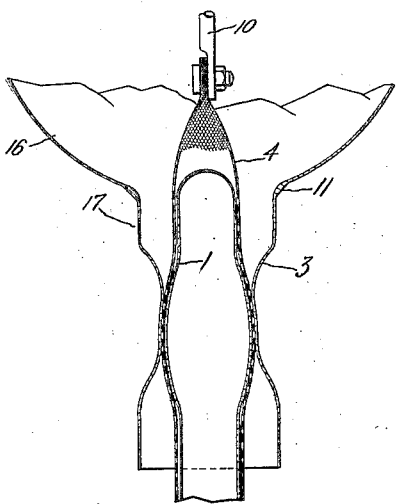

The novel features which we believe to be characteristic of our invention are set forth with particularity in the appended claims. The invention itself, however, will best be understood with reference to the following specification when considered in connection with the accompanying drawing in which Fig. 1 shows the method of forming the seal; Fig. 2 shows the completed seal applied to a receptacle; Fig. 3 shows a modification of the arrangement disclosed in Fig. 1; Fig. 4 shows the seal disclosed in Fig. 3 applied to a receptacle; Figs. 5 and 6 show the seal applied to a mercury vapor lamp and to a tungsten arc lamp respectively.

Referring to the drawing, we have indicated at 1 a glass tube closed at one end and provided at its opposite open end with a rim 2 fused to the interior surface of a second tube 3 of somewhat greater inside diameter than tube 1. After rim 2 is fused to tube 3, a woven wire hose 4 is pushed over tube 1, the hose having a diameter substantially equal to or somewhat less than the diameter of tube 1 so that the hose will fit snugly on the tube. The wire hose may be made of any metal or metal alloy suitable for fusing-in, such for example as platinum, tantalum, tungsten or molybdenum. After the hose 4 has been placed on the inner tube 1, air pressure higher than that existing in the annular space 5 between the tubes 1 and 3 may be supplied to the inner space 6 of tube 1. An air pump may be applied to the annular space 5 to produce a reduced pressure therein and tube 1 connected to the atmosphere or, if desired, air may be blown into tube 1. Tubes 1 and 3 are now heated by burners 7 at a point intermediate the length of the tubes until the glass softens. The softened parts of the exterior tube 3 draw together, as indicated by the dotted lines 8, due to the flame pressure, capillary action and low pressure existing in the annular space 5, while the softened parts of the inner glass tube 1, together with the woven wire hose are expanded or pressed out by the pressure existing in the space 6 of tube 1, as indicated likewise by the dotted lines 9, until the softened glass parts of both tubes 1 and 3 flow into one another filling out all the meshes of the woven hose and imbedding the same air-tight in the molten glass of both tubes.

After the fusing-in of the woven hose 4, tubes 1 and 3 are cut as indicated by the line A—B, the inner tube being cut some distance below its opening and rim 2. The upper free end of the woven hose 4 is then drawn lengthwise so that it may fasten to a wire or rod 10 serving to conduct current to an electrode or a lighting body, the conductor being fastened to the woven wire by a clamp, soldering or other suitable means. The upper edge of tube 3 is finally fused at 11 to the glass vessel 12 which is to be provided with the current inlet 4. The opposite or lower end of the wire hose 4 can be used alone as a current conductor or if desired it may be fixed to a conductor 13 in any suitable manner.

In the modification shown in Fig. 3, the inner tube 1 has a collar 14 which limits the superposition of the woven wire hose 4 onto the inner tube 1. Above this collar the outer tube 3 is provided with a constriction 15 in order that the inner tube may be fused to the outer tube at that point. After the fusing of the woven wire hose is completed, and after the separation of the tubes 1 and 3 on the line A—C, the tube body may be fused in the same manner as indicated in Fig. 2 to a glass vessel 16.

If desired the lower portion 17 of tube 3 may be fused to the vessel 16 as indicated in Fig. 4, thus reversing the tube body with respect to the vessel. If desired, the woven wire hose 4 may be pushed onto the inner tube 3 before the inner tube is fused to the outer tube 1 in which case care should be taken not to push the hose up to the point where the inner tube is fused to the outer tube.

Fig. 5 discloses a mercury vapor lamp consisting of a straight tube 18 of quartz or similar difficultly fusible glass, and having mercury cups 19 attached to both ends. To this vessel 20 there are fused two tube bodies 1 and 3 provided with a fused-in woven wire hose 4 in such a manner that the upper end of the woven wire hose dips into the mercury electrodes of the lamp.

Fig. 6 shows a tungsten arc lamp which comprises a glass vessel 21, a stem 22, base 23 and two electrodes 24. In this figure two tube bodies 1—3, each provided with a fused-in woven wire hose, are fused to the stem 22. The supporting stems 25 of the electrodes 24 are clamped to the tube bodies 1—3 by means of small clips 26, while the lower ends of the fused-in woven wire hoses are connected with the base cap 23 and the bottom contact 27 of the base. The upper ends of the woven wire hose are conductively connected with supporting stems 25 of the electrodes 24.

Our improved method of fusing in current inlets can be advantageously used in connection with other closed glass vessels, for example, in rectifiers, X-ray tubes, incandescent lamps and other high vacuum devices, and especially in high candle power projection incandescent lamps.

What we claim as new and desire to secure by Letters Patent of the United States, is:—

1. The method of sealing a tubular perforated metal member into vitreous material which comprises joining a hollow cylindrical vitreous member to a second vitreous member so as to produce inner and outer members with an annular space therebetween, inserting the perforated metal member over the inner vitreous member and fusing both vitreous members to the perforated member.

2. The method of sealing a tubular perforated metal member into vitreous material which comprises joining a hollow cylindrical vitreous member to a second vitreous member so as to produce inner and outer members with an annular space therebetween, inserting the perforated metal member over the inner vitreous member, heating the combined vitreous members and perforated member, and applying pressure to the vitreous members to thereby cause them to become fused to one another and to the perforated member.

3. The method of sealing a tubular perforated metal member into vitreous material which comprises joining a hollow cylindrical vitreous member to a second vitreous member so as to produce inner and outer members with an annular space therebetween, inserting the perforated metal member over the inner vitreous member, heating the combined vitreous members and perforated member at a point intermediate their length, and pressing the heated portion of the inner and outer members into contact with each other.

In witness whereof, we have hereunto set our hands this 1st day of October, 1927.

WERNER FEHSE.
WILHELM HAGEN.